(12) United States Patent
Arunachalam et al.

(10) Patent No.: US 11,503,659 B2
(45) Date of Patent: Nov. 15, 2022

(54) ROUTING OPTIMIZATION FOR SERVICE CAPABILITY EXPOSURE

(71) Applicant: T-Mobile USA, Inc., Bellevue, WA (US)

(72) Inventors: Kameswaran Arunachalam, Redmond, WA (US); Kunal Prakash Barawkar, Bothell, WA (US); Karunakalage Viraj Rakitha Silva, Renton, WA (US); Zenaida Castro Canlas-Factora, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/248,238

(22) Filed: Jan. 15, 2021

(65) Prior Publication Data

US 2022/0232648 A1 Jul. 21, 2022

(51) Int. Cl.
*H04W 76/15* (2018.01)
*G16Y 10/75* (2020.01)
(Continued)

(52) U.S. Cl.
CPC ............ *H04W 76/15* (2018.02); *G16Y 10/75* (2020.01); *H04W 8/08* (2013.01); *H04W 76/11* (2018.02)

(58) Field of Classification Search
CPC ....... H04W 76/15; H04W 76/11; H04W 8/08; H04W 12/08; H04W 12/102; H04W 12/30; H04W 24/02; H04W 40/00; H04W 88/00; H04W 88/10; H04W 88/12; H04W 88/14; H04W 88/16; H04W 88/18; H04W 8/22; H04W 76/00; H04W 76/10; H04W 88/02; H04W 8/04; H04W 8/00; H04L 29/06319; H04L 29/06326; H04L 67/1027; H04L 67/14; H04L 67/141; H04L 67/146;
(Continued)

(56) References Cited

U.S. PATENT DOCUMENTS

2018/0054765 A1* 2/2018 Kim et al. ............ H04W 36/06
2018/0332462 A1* 11/2018 Kim et al. ............ H04W 8/082
(Continued)

OTHER PUBLICATIONS

3GPP, "Technical Specification Group Services and System Aspects; Architecture enhancements to facilitate communications with packet data networks and applications", Release 16, vol. SAWG2, No. V16.8.0, Sep. 24, 2020, pp. 1-135.
(Continued)

*Primary Examiner* — Meless N Zewdu
(74) *Attorney, Agent, or Firm* — Lee & Hayes, P.C.

(57) ABSTRACT

A carrier network may provide connection establishment and routing optimization for Service Capability Exposure Function (SCEF). For example, a Mobility Management Entity (MME) component may transmit, to a SCEF, a connection request to establish a session, the request using a first SCEF identifier (ID). The MME may receive, from a particular SCEF instance of the SCEF, an answer for the session, the answer including an identifier that is different from the first SCEF-ID, the identifier associated with the particular SCEF instance. The MME may transmit, to the particular SCEF instance, a subsequent message for the session, wherein a second SCEF-ID of the subsequent message is associated with the identifier and is different from the first SCEF-ID.

20 Claims, 4 Drawing Sheets

(51) Int. Cl.
*H04W 8/08* (2009.01)
*H04W 76/11* (2018.01)

(58) Field of Classification Search
CPC ........ G16Y 10/75; G16Y 30/00; G16Y 30/10; G16Y 40/00
See application file for complete search history.

(56) References Cited

U.S. PATENT DOCUMENTS

| | | | |
|---|---|---|---|
| 2018/0332636 A1* | 11/2018 | Lu et al. | H04W 76/10 |
| 2019/0028337 A1* | 1/2019 | Ryu et al. | H04L 41/0806 |
| 2019/0141486 A1* | 5/2019 | Lu et al. | H04W 4/06 |
| 2019/0166016 A1 | 5/2019 | Livanos et al. | |
| 2019/0254108 A1* | 8/2019 | Iwai et al. | H04W 76/27 |
| 2019/0281116 A1* | 9/2019 | Yang et al. | H04L 67/1097 |
| 2019/0297669 A1* | 9/2019 | Kawasaki et al. | H04W 80/10 |
| 2020/0053615 A1* | 2/2020 | Chiba et al. | H04W 36/14 |
| 2020/0146077 A1* | 5/2020 | Li et al. | H04W 76/10 |
| 2021/0160680 A1* | 5/2021 | Velev et al. | H04W 8/005 |
| 2021/0368558 A1* | 11/2021 | Wang et al. | H04W 76/11 |

OTHER PUBLICATIONS

Extended European Search Report dated Jun. 14, 2022 for European Patent Application No. 22150494.7, 13 pages.

* cited by examiner

ROUTING OPTIMIZATION FOR SERVICE CAPABILITY EXPOSURE

BACKGROUND

In recent years, mobile devices have advanced from offering simple voice calling services within wireless communication networks to providing users with many new features, often utilized by Internet of Things (IoT) devices. Some networks utilize a Service Capability Exposure Function (SCEF) to support IoT devices. As the number of such devices grows, routing may become burdensome.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
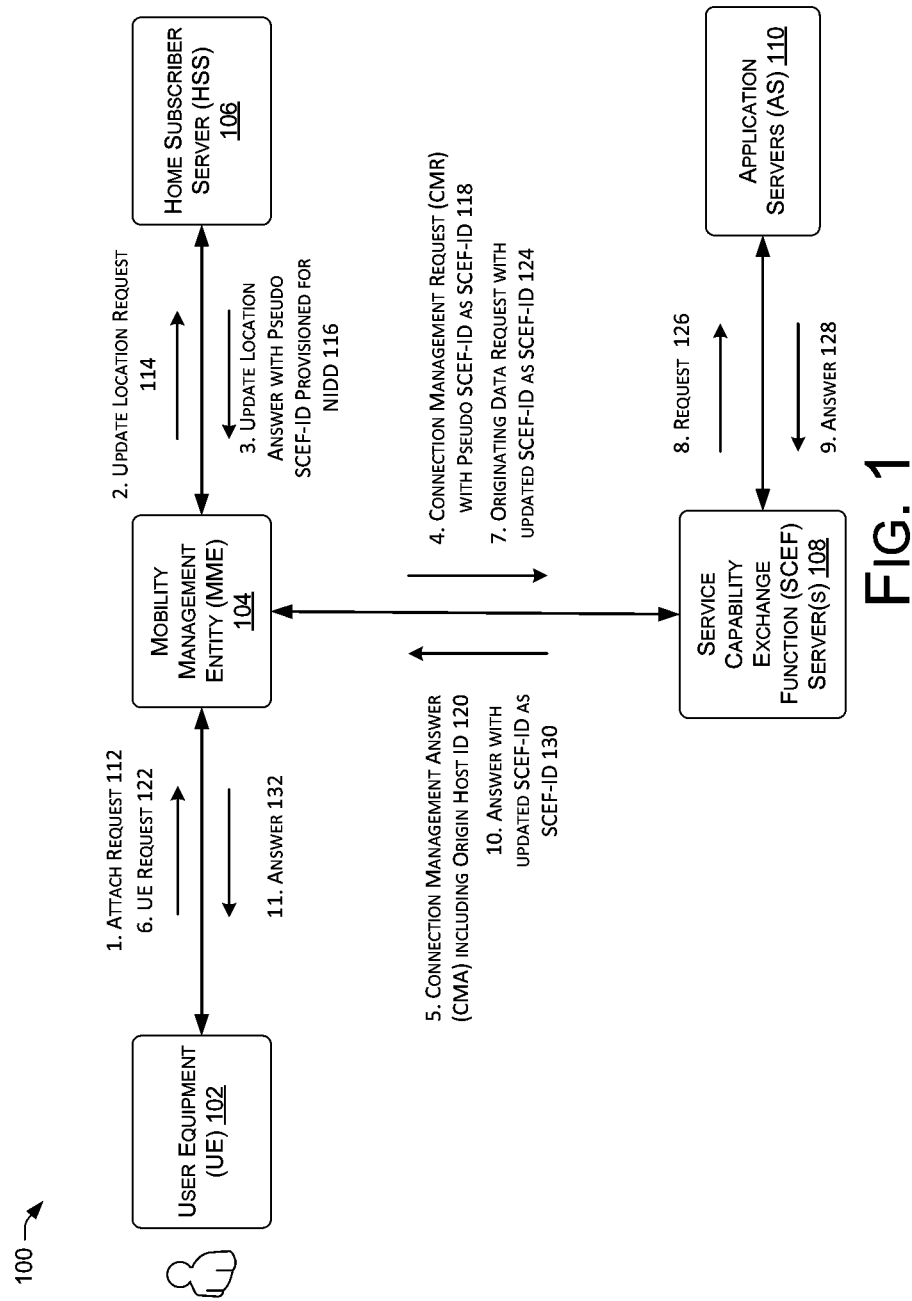
FIG. 1 is a block diagram illustrating a communication system that may provide connection establishment and routing for a SCEF utilizing a pseudo ID as a SCEF Identifier (SCEF-ID) during connection establishment.

The described implementations include devices, systems, and methods that provide connection establishment and routing optimization for a Service Capability Exposure Function (SCEF) in, for example, a carrier network. In some examples, a pseudo ID may be utilized by a Mobility Management Entity (MME) as a SCEF Identifier (SCEF-ID) during connection establishment. In particular, a pseudo ID may be provisioned by a Home Subscriber Server (HSS) once and used as a SCEF-ID by the MME for a plurality of connection establishment requests (e.g., for different sessions and/or different user equipment (UE)). The use of the pseudo ID may minimize HSS provisioning operations and may simplify the routing in a distributed application environment in which more than one SCEF instance is deployed.

Once the MME receives a response to the connection establishment request from a SCEF instance, the MME may store an identifier particular to the SCEF instance from the response (e.g., the "Origin Host" ID of the SCEF instance) as an updated SCEF-ID of the SCEF instance for the current session. Additionally or alternatively, the MME may determine an updated SCEF-ID based on the identifier particular to the SCEF instance, potentially in combination with other data. The MME may then use the updated SCEF-ID for subsequent requests to the SCEF instance for that session. Similarly, the SCEF instance may utilize the updated SCEF-ID from the subsequent requests as the SCEF-ID utilized in responses to the MME.

In certain described embodiments, the devices, systems, and methods disclosed herein relate to providing connection establishment and routing in an Internet-of-Things carrier network (e.g., Narrowband Internet-of-Things (NB-IoT) carrier network) that provides support for devices using Non-IP Data Delivery (NIDD). UEs may use NIDD in order to exchange data with the MME, which may pass that data to the SCEF for onward delivery to IoT application servers. Thus, NIDD may provide a path to exchange data between a user equipment (UE) and an application server (AS) without requiring the UE to support an IP stack.

In some examples, SCEF servers may securely expose the services and capabilities of carrier networks. Such services and capabilities may include support for Non-IP Data Delivery (NIDD), communication patterns (CP), monitoring events (MONTE), triggering, and other features.

By utilizing a pseudo ID as the SCEF-ID in the connection management request and, after successful connection establishment, updating the SCEF-ID based on the response from the SCEF instance, subsequent messages of the session may use the same SCEF-ID. This may provide multiple advantages. First, the HSS configuration in examples according to this disclosure may have reduced minimum specifications due to provisioning a single pseudo SCEF-ID for multiple application instances. This may reduce the overhead and complexity incurred by provisioning and maintaining many SCEF-IDs. Second, examples according to this disclosure may ensures NB-IoT session continuity in the distributed application architecture. Third, examples according to this disclosure may have the same route on subsequent messages of the session. The use of the same route may limit and/or reduce latency and may alleviate the need for an external database to store session information. Additionally, examples according to the disclosed subject matter may avoid the use of a session-aware routing agent (e.g., a Diameter Routing Agent (DRA)) in the network which may reduce complexity, cost and effort in establishing and operating the network.

While NB-IoT NIDD via SCEF may be utilized in the discussions of example embodiments throughout this disclosure, this disclosure and the appended claims are not so limited. For example, other embodiments may utilize other IoT networks, protocols, and standards to accomplish similar functions. Further, other embodiments may utilize the disclosed systems and methods for other operations such as monitoring events (MONTE).

FIG. 1 illustrates an example telecommunication system 100, which may provide connection establishment and routing for a SCEF utilizing a pseudo ID as a SCEF Identifier (SCEF-ID) during connection establishment, according to some implementations. The system 100 includes user equipment (UE) 102, a Mobility Management Entity (MME) 104, a Home Subscriber Server (HSS) 106, one or more Service Capability Exchange Function (SCEF) server(s) 108, and an application server (AS) 110. In some examples, the system 100 may be a NB-IoT network.

Generally, in some examples, the MME 104 may operate to authenticate user devices by interacting with the HSS 106. Specifically, the MME 104 may send an update location request (ULR) to the HSS 106 upon receiving an attach request from a UE 102. The ULR may cause the HSS 106 to authorize the requested service for the UE 102. Further, the MME 104 may operate to connect user devices with an appropriate AS 110 via a Service Capability Exchange Function (SCEF) provided by SCEF instances operating on SCEF server(s) 108. Specifically, the MME 104 may receive an update location answer (ULA) that authorizes the requested service for the UE 102 and which includes the pseudo ID in a SCEF-ID field. The MME 104 may utilize the pseudo SCEF-ID in connection management requests (CMRs) to establish sessions with a SCEF instances as discussed below.

The HSS 106 may provide a central database that contains user-related and subscription-related information. The functions of the HSS 106 can include mobility management, call and session establishment support, user authentication and access authorization. In some examples, the HSS 106 can manage subscription-related information in real time, for multi-access and multi-domain offerings. The HSS 106 can be based on Home Location Register (HLR) and Authentication Center (AuC). As mentioned above, the HSS 106 may provide the MME 104 with a pseudo SCEF-ID upon authorization of the UE. More particularly, upon initialization, the HSS 106 may provision a pseudo SCEF-ID once and provide the pseudo SCEF-ID to the MME 104 as a SCEF-ID in ULAs for a plurality of ULRs. As such, the MME 104 may utilize the same pseudo SCEF-ID as the SCEF-ID of multiple CMRs (e.g., for different sessions and/or different user equipment (UE)).

The SCEF server(s) 108 may operate to provide one or more SCEF instance(s). The SCEF instances operating on the SCEF server(s) 108 may expose network services and capabilities via a set of Application Programming Interfaces (APIs) and hide the underlying network topology. For example, SCEF instances may be deployed in support of IoT, whereby IoT devices (e.g., UE 102) can use NIDD in order to exchange data with the MME 104, which in turn passes that data to the SCEF instances for onward delivery to the AS 110. In some examples, each SCEF instance may have its own identifier (e.g., SCEF-ID). As will be discussed below, the identifier of the SCEF instance may be extracted from a CMA by the MME 104 and utilized by the MME 104 as an updated SCEF-ID for the SCEF instance, replacing the pseudo SCEF-ID previously stored for the session.

The UE 102 may comprise a communication device configured to communicate over a wireless and/or wireline network. UE 102 may also comprise a non-mobile computing device, including, without limitation such things as televisions, desktop computers, a game consoles, set top boxes, home automation components, security system components, and so forth. While examples discussed herein relate to UEs that are IoT devices, implementations are not so limited. For example, mobile computing devices may include, without limitation, a mobile phone (e.g., a smart phone), a tablet computer, a laptop computer, a portable digital assistant (PDA), a wearable computer (e.g., electronic/smart glasses, smart watches, fitness trackers, etc.), a networked digital camera, etc. In this sense, the terms "communication device," "wireless device," "wireline device," "mobile device," "computing device," and "user equipment (UE)" may be used interchangeably herein to describe any communication device capable of performing the techniques described herein.

Furthermore, UE 102, as well as the various network provider components described herein, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future network technology or evolution of an existing network technology (e.g., IP or Non-IP based). These are merely examples and UE 102, as well as the various network provider components described herein, may be capable of communicating via one or more of a 3G, 4G, 4G LTE, and/or 5G protocols.

The UE 102 may communicate with the MME 104 using an access network (not shown), which may comprise a cellular communication network or other type of wired or wireless network. Examples of wireless access networks include LTE, WIFI, GSM EDGE Radio Access Network (GERAN), UMTS Terrestrial Radio Access Network (UTRAN), and other cellular access networks.

In the operations illustrated in FIG. 1, the UE 102, MME 104, HSS 106, SCEF server 108, and AS 110 may operate to provide connection establishment between UE 102 and AS 110 and routing to and from the SCEF server(s) 108 utilizing a pseudo ID as a SCEF Identifier (SCEF-ID) during connection establishment. Following receipt of a message indicating successful connection establishment from a SCEF instance, the MME 104 may update the stored SCEF-ID of the session to an identifier of the SCEF instance included in the message indicating successful connection establishment.

Initially, the UE 102 may be configured to generate and send an attach request 112 to the MME 104. The attach request may provide identification of the UE 102 and indicate the AS 110 or service of AS 110 the UE 102 is requesting to access or utilize. The MME 104 may receive the attach request 112 and determine the attach request 112 relates to establishing a session with AS 110 for the UE 102 via SCEF. The MME 104 may further determine that a SCEF session for the UE 102 has not been established. In response, the MME 104 may send an update location request (ULR) 114 to the HSS 106 requesting the HSS 106 authorize the SCEF session for the UE 102 based on subscription information maintained by the HSS 106 and information included the attach request 112. In some examples, the MME 104 may communicate with the HSS 106 via a Diameter S6a interface.

The HSS 106 may receive the ULR 114 and, based thereon, determine whether the UE 102 is authorized to access or utilize the requested service of the AS 110. If so, the HSS 106 may provide an update location answer (ULA) 116 to the MME 104 that may authorize UE and include a pseudo SCEF-ID. As discussed above, the pseudo SCEF-ID may have been provisioned previously and may be used, in some cases, by the MME 104 to establish multiple or all SCEF sessions (e.g., for different sessions and/or different user equipment (UE)).

The MME 104 may then generate and send a connection management request (CMR) 118 to the SCEF server(s) 108. The CMR 118 may be sent via a Diameter T6a interface. The CMR 118 may include the pseudo SCEF-ID in a SCEF-ID field. Though not shown for simplicity of illustration and explanation, a Diameter Routing Agent (DRA) may operate to route the CMR 118 to a SCEF instance operating on the SCEF server(s) 108 based on the SCEF-ID field containing the pseudo SCEF-ID and/or other factors such as load balancing or routing metrics.

A SCEF instance operating on the SCEF server(s) 108 may receive the CMR 118 from the MME 104. The SCEF instance may determine the CMR 118 requests establishment of a session associated with an application server (e.g., AS 110). The SCEF instance may determine the CMR 118 is valid and return a connection management answer (CMA) 120 to the MME 104 including an "Origin-Host" ID field identifying the SCEF instance. Generally, the "Origin-Host" ID field of the CMA 120 may have the same value as the SCEF-ID of the SCEF instance that originated the CMA 120 towards the MME 104. As mentioned above, the SCEF-ID may be an identifier of the SCEF instance. In some examples, the CMA 120 may include the pseudo SCEF-ID as the value of the SCEF-ID field. In other examples, rather than using the pseudo SCEF-ID as the value of the SCEF-ID field of the CMA 120, the SCEF instance may utilize the SCEF-ID of the SCEF instance as the value of the SCEF-ID field of the CMA 120.

The MME 104 may receive the CMA 120 including the "Origin-Host" ID identifying the SCEF instance. The MME 104 may verify the success of the connection establishment. The MME 104 may then extract the "Origin-Host" ID from the CMA 120 (e.g., which may be the same as the SCEF-ID of the SCEF instance). The MME 104 may then update the stored SCEF-ID for the SCEF session for the UE 102 to the value of the "Origin-Host" ID field of the CMA 120. In this manner, the information stored at the MME 104 for the session of the UE 102 associated with the attach request 112 includes the identifier of the SCEF instance handling the session. As will be discussed below, the MME 104 may utilize the updated SCEF-ID stored for the session in generating future requests to the AS 110 via SCEF.

In particular, when the UE 102 subsequently generates and sends a UE request 122 to the AS 110 via the MME 104, the MME 104 may utilize the session information including the updated SCEF-ID to send a mobile-originating data request (ODR) 124 to the SCEF instance operating on the SCEF server(s) 108. More particularly, the ODR 124 may include the updated SCEF-ID in the SCEF-ID field of the ODR 124. As mentioned above, the updated SCEF-ID stored at the MME may be the same as the value of the "Origin-Host" ID field of the CMA 120. As such, the ODR 124 may be delivered to and received by the same SCEF instance that sent the CMA 120.

The SCEF instance may receive the ODR 124, and, based thereon, may generate and send a request 126 to the AS 110. The AS 110 may receive and process the request 126 and send an answer 128 to the SCEF instance. In some examples, the SCEF server(s) 108 may communicate with the AS 110 via a Diameter T8 interface.

The SCEF instance may receive the answer 128 from the AS 110. The SCEF instance may then return a mobile-originating data answer (ODA) 130 to the MME 104 including the answer from the AS 110. In some examples, the value of the SCEF-ID field of the ODA 130 may be set to the updated SCEF-ID (e.g., the identifier of the SCEF instance).

In turn, the MME 104 may receive the ODA 130 from the SCEF instance. Based on the answer from the AS 110 and the SCEF-ID field and/or other fields of the ODA 130, the MME 104 may provide the UE 102 an answer 132 to the UE request 122.

Figure 2:
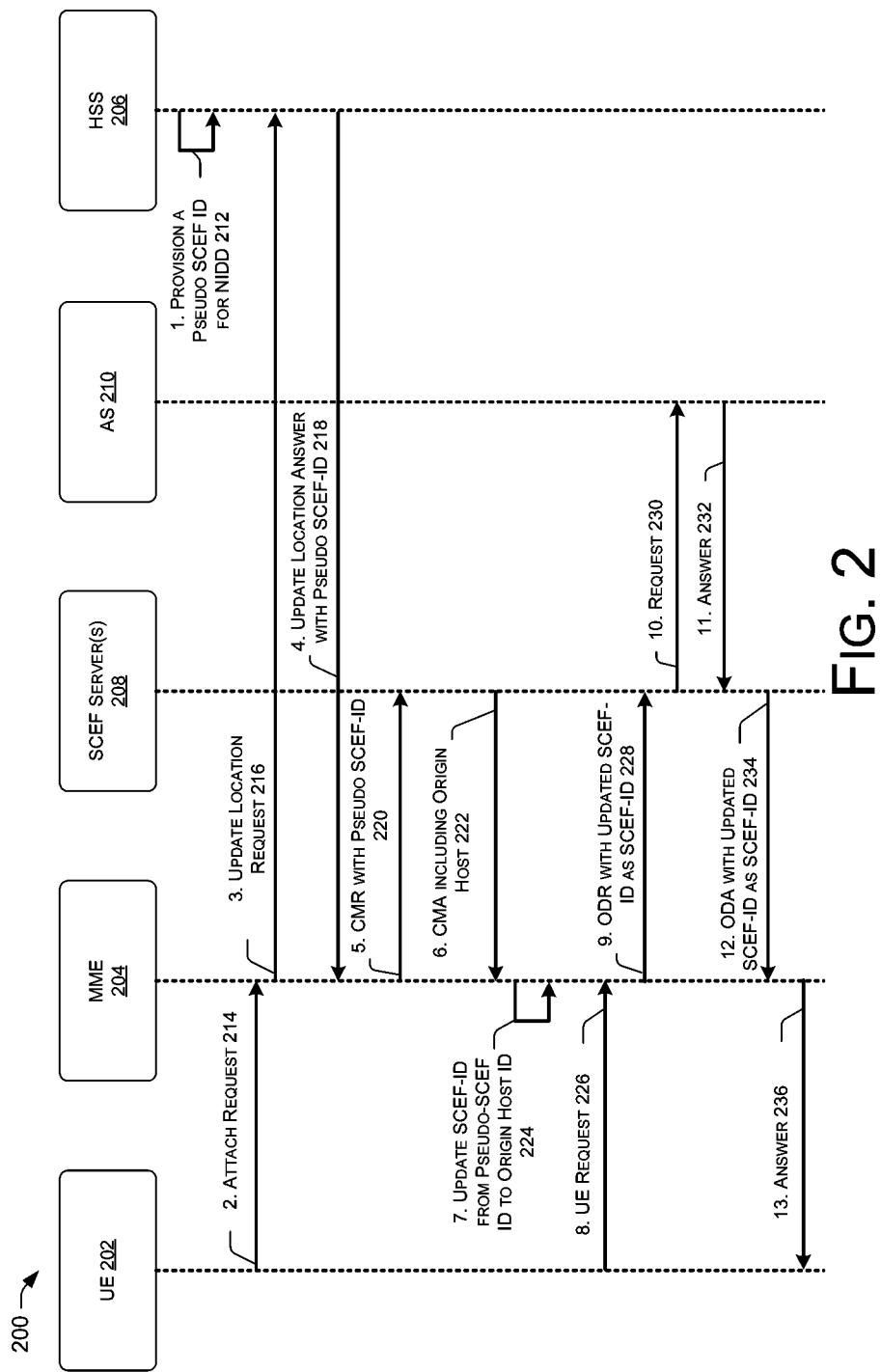
FIG. 2 is a flow diagram illustrating an example method of providing connection establishment and routing for a SCEF utilizing a pseudo ID as a SCEF Identifier (SCEF-ID) during connection establishment.
Figure 3:
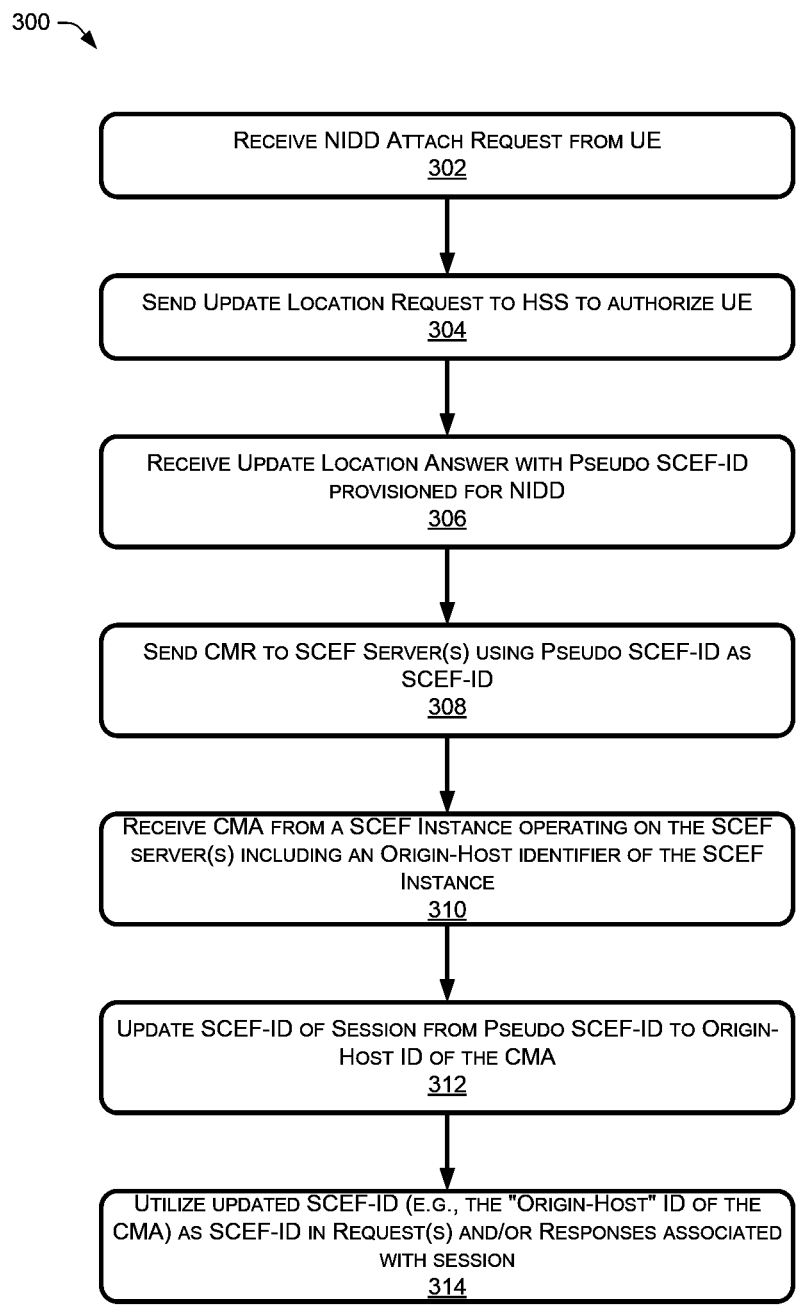
FIG. 3 is a flow diagram illustrating an example method of for providing connection establishment and routing for a SCEF utilizing a pseudo ID as a SCEF Identifier (SCEF-ID) during connection establishment.

While FIG. 1 illustrates a simplified and generalized example system and communications flow for providing connection establishment and routing for a SCEF utilizing a pseudo ID as a SCEF-ID during connection establishment, implementations are not limited to the specifics of FIG. 1. Rather, details may vary from implementation to implementation and are not limited to NB-IoT NIDD via SCEF. Further, while the illustrated as operating one or more SCEF instances, in some implementations, the SCEF server(s) may operate a single respective SCEF instance. FIGS. 2 and 3 may illustrate particular example communication flows in example implementations.

FIG. 2 illustrates an example communication flow 200 for providing connection establishment and routing for a SCEF utilizing a pseudo ID as a SCEF Identifier (SCEF-ID) during connection establishment, according to some implementations. In the illustrated example, the system includes user equipment (UE) 202, MME 204, a HSS 206, SCEF server(s) 208, and application server(s) 210. In the illustrated example, the data flow may relate to an implementation of the disclosed systems and methods in a carrier network utilizing a SCEF to provide NIDD for IoT devices.

In the operations illustrated in FIG. 2, the HSS 206 may operate to provision a pseudo SCEF-ID 212 for NIDD. More particularly, the HSS 206 may provision a pseudo SCEF-ID once and provide the pseudo SCEF-ID to the MME 204 in ULAs as a SCEF-ID for a plurality of ULRs (e.g., for different sessions and/or different user equipment (UE)).

The UE 202 may generate and send an attach request 214 to the MME 204. As discussed above, the attach request 214 may provide identification of the UE 202 and indicate the AS 210 or service or the AS 210 the UE 202 is requesting to access or utilize.

The MME 204 may receive the attach request 214 and determine the attach request 214 relates to establishing a session with AS 210 for the UE 202 via SCEF. The MME 204 may further determine that a SCEF session for the UE 202 has not been established. In response, the MME 204 may send a ULR 216 to the HSS 206 requesting the HSS 206 authorize the SCEF session for the UE 202 based on subscription information maintained by the HSS 206 and information included the attach request 214.

The HSS 206 may receive the ULR 216 and, based thereon, determine whether the UE 202 is authorized to access or utilize the AS 210 or requested service of the AS 210. If so, the HSS 206 may provide an ULA 218 to the MME 204 that may authorize the session and which may include the pseudo SCEF-ID 212. As discussed above, the pseudo SCEF-ID 212 may have been provisioned previously and may be used, in some cases, by the MME 204 for multiple or all SCEF sessions.

The MME 204 may then generate and send a connection management request (CMR) 220 to the SCEF server(s) 208. The CMR 220 may include the pseudo SCEF-ID in a SCEF-ID field of the CMR 220. Though not shown for simplicity of illustration and explanation, a Diameter Routing Agent (DRA) may operate to route the CMR 220 to a SCEF instance operating on the SCEF server(s) 208 based on the SCEF-ID field containing the pseudo SCEF-ID and/or other factors such as load balancing or routing metrics.

A SCEF instance operating on the SCEF server(s) 208 may receive the CMR 220 from the MME 204. The SCEF instance may determine the CMR 220 requests establishment of a session for the UE 202 associated with an application server (e.g., AS 210). The SCEF instance may determine the request is valid and then return a connection management answer (CMA) 222 to the MME 204 including an "Origin-Host" ID field identifying the SCEF instance. Generally, the "Origin-Host" ID field of the CMA 222 may have the same value as the SCEF-ID of the SCEF instance which has originated the CMA 222 towards the MME 204. As mentioned above, the SCEF-ID may be an identifier of the SCEF instance. In some examples, the SCEF instance may include the pseudo SCEF-ID as the value of the SCEF-ID field in the CMA 222. In other examples, rather than using the pseudo SCEF-ID as the value of the SCEF-ID field of the CMA 222, the SCEF instance may utilize the SCEF-ID of the SCEF instance as the value of the SCEF-ID field of the CMA 222.

The MME 204 may receive the CMA 222 including the "Origin-Host" ID field identifying the SCEF instance. The MME 204 may verify the success of the connection establishment. The MME 204 may then extract the "Origin Host" ID field from the CMA 222. The MME 104 may then update the stored SCEF-ID 224 for the SCEF session of the UE 202 to the value of the "Origin-Host" ID field of the CMA 222. In this manner, the information stored at the MME for the session of the UE 202 associated with the attach request 214 includes the identifier of the SCEF instance handling the session. As will be discussed below, the MME 204 may utilize the updated SCEF-ID stored for the session in generating future requests to the AS 210 via the SCEF instance.

In particular, when the UE 202 subsequently generates and sends a UE request 226 to the AS 210 via the MME 204, the MME 204 may utilize the session information including the updated SCEF-ID to send a mobile-originating data request (ODR) 228 to the SCEF instance operating on the SCEF server(s) 208 that includes the updated SCEF-ID (e.g., the value of the "Origin-Host" ID field of the CMA 222) as the SCEF-ID of the ODR 228. As such, the ODR 228 may be delivered to and received by the same SCEF instance that sent the CMA 222.

The SCEF instance may receive the ODR 228, and, based thereon, generate and send a request 230 to the AS 210 associated with the SCEF instance and the requested service. The AS 210 may receive and process the request 230. Based thereon, the AS 210 may send an answer 232 to the SCEF instance.

The SCEF instance may receive the answer 232 from the AS 210. The SCEF instance may then return a mobile-originating data answer (ODA) 234 to the MME 204 including the answer from the AS 210. In some examples, the value of the SCEF-ID field of the ODA 234 may be set to the updated SCEF-ID (e.g., the identifier of the SCEF instance).

In turn, the MME 204 may receive the ODA 234 from the SCEF instance. Based on the answer of the AS 210 and the SCEF-ID field and/or other field(s) of the ODA 234, the MME 204 may provide an answer 236 to the UE 202.

FIG. 3 illustrates an example method 300 for providing connection establishment and routing for a SCEF utilizing a pseudo ID as a SCEF Identifier (SCEF-ID) during connection establishment, according to some implementations. More particularly, FIG. 3 illustrates operations of a MME (e.g., MMEs 104 and 204) that may provide connection establishment and routing for a SCEF utilizing a pseudo ID as a SCEF-ID during connection establishment.

At 302, the MME may receive a NIDD attach request from a UE. At 304, the MME may send a ULR to the HSS to authorize the UE. At 306, the MME may receive an update location answer from the HSS that may include a pseudo SCEF-ID provisioned by the MME for NIDD via SCEF.

At 308, the MME may send a CMR to the SCEF server(s) using the pseudo SCEF-ID as the value of the SCEF-ID field of the CMR. In response, at 310, the MME may receive a CMA from a SCEF instance operating on the SCEF server(s) including a "origin-host" ID field including an identifier of the SCEF instance originating the CMA.

At 312, the MME may update a stored SCEF-ID value of the session being established from the pseudo SCEF-ID to the value of the "origin-host" ID field of the CMA. As mentioned above, the "origin-host" identifier of the SCEF instance may be the same as the SCEF-ID of the SCEF instance.

At 314, the MME may utilize the updated SCEF-ID (e.g., the "Origin-Host" ID of the CMA) as the value of the SCEF-ID field in subsequent request(s) and/or responses associated with session being established.

Additional details of the operations shown in FIG. 3 are provided above with regard to FIGS. 1 and 2 and are not repeated here to avoid unnecessary verbosity.

Figure 4:
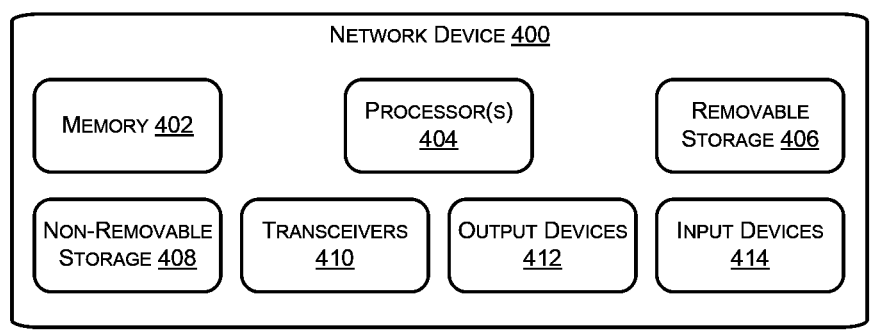
FIG. 4 is a block diagram illustrating relevant high-level components of a device that may be used to implement various of the components described herein.

FIG. 4 illustrates a component level view of a telecommunication network device 400 capable of implementing the UEs 102 and 202, MMEs 104 and 204, HSSs 106 and 206, SCEF Server(s) 108 and 208, and/or AS(s) 110 and 210 of FIGS. 1 and 2. The network device 400 may, as an example, comprise a physical or virtual device. The network device 400 may comprise a system memory 402 storing various executable components and data for implementing the systems and methods 100-300 of FIGS. 1-2. The network device 400 may further comprise processor(s) 404, a removable storage 406, a non-removable storage 408, transceivers 410, output device(s) 412, and input device(s) 414, any or all of which can be communicatively connected via a communications bus (not shown).

In various examples, the system memory 402 is volatile (such as RAM), non-volatile (such as ROM, flash memory, etc.) or some combination of the two. In some examples, the processor(s) 404 is a central processing unit (CPU), a graphics processing unit (GPU), or both CPU and GPU, or any other sort of processing unit.

The network device 400 also includes additional data storage devices (removable and/or non-removable) such as, for example, magnetic disks, optical disks, or tape. Such additional storage is illustrated in FIG. 4 by removable storage 406 and non-removable storage 408. The system memory 402, removable storage 406 and non-removable storage 408 are all examples of non-transitory computer-readable storage media.

In some examples, the transceivers 410 include any sort of transceivers known in the art. For example, transceivers 410 may include a radio transceiver that performs the function of transmitting and receiving radio frequency communications. Also, or instead, the transceivers 410 may include other wireless or wired connectors, such as Ethernet connectors or near-field antennas. The transceivers 410 may facilitate connectivity between a public network, such as a packet-switched access network (not shown), and one or more other devices of a telecommunication network.

In some examples, the output devices 412 include any sort of output devices known in the art, such as a display, speakers, a vibrating mechanism, or a tactile feedback mechanism. Output devices 412 also include ports for one or more peripheral devices, such as headphones, peripheral speakers, or a peripheral display.

In various examples, the input devices 414 include any sort of input devices known in the art. For example, the input devices 414 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, by a Mobility Management Entity (MME) of a carrier network, a request associated with a user equipment (UE) for a Non-IP Data Delivery (NIDD) connection via a service capability exposure function (SCEF);
   transmitting, by the MME and to the SCEF, a connection management request to establish a session, the connection management request using a first SCEF identifier (ID) provisioned for NIDD via the SCEF;
   receiving, by the MME and from a particular SCEF instance of the SCEF, a connection management answer for the session, the connection management answer including an identifier that is different from the first SCEF-ID, the identifier associated with the particular SCEF instance; and
   transmitting, by the MME and to the particular SCEF instance, a subsequent message for the session, wherein a second SCEF-ID of the subsequent message is associated with the identifier and is different from the first SCEF-ID.

2. The method of claim 1, further comprising:
   receiving, by the MME of the carrier network, another request for another NIDD connection via the SCEF, the other request associated with another UE;
   transmitting, by the MME and to the SCEF, another connection management request to establish another session, the other connection management request using the first SCEF-ID provisioned for NIDD via the SCEF;
   receiving, by the MME and from another particular SCEF instance of the SCEF, another connection management answer for the other session, the other connection management answer including another identifier that is different from the first SCEF-ID and the identifier, the other identifier associated with the other particular SCEF instance; and
   transmitting, by the MME and to the other particular SCEF instance, another subsequent message for the other session, wherein a third SCEF-ID of the other subsequent message is associated with the other identifier and is different from the first SCEF-ID, the second SCEF-ID and the identifier.

3. The method of claim 1, wherein the MME is configured to route a plurality of subsequent requests associated with the session to the particular SCEF instance based on the second SCEF-ID.

4. The method of claim 1, wherein the MME is configured to use the first SCEF-ID for a plurality of connection management requests associated with different UE.

5. The method of claim 1, further comprising:
   receiving, by the MME, the first SCEF-ID from a Home Subscriber Server (HSS) of the carrier network.

6. The method of claim 1, wherein the UE is a Narrowband Internet of Things (NB-IoT) device.

7. The method of claim 1, wherein the identifier is an origin-host identifier included in the connection management answer.

8. A system comprising:
   one or more computing devices of a carrier network configured to perform operations comprising:
      transmitting, by a Mobility Management Entity (MME) and to a service capability exposure function (SCEF), a connection request to establish a session, the request using a first SCEF identifier (ID);
      receiving, by the MME and from a particular SCEF instance of the SCEF, an answer for the session, the answer including an identifier that is different from the first SCEF-ID, the identifier associated with the particular SCEF instance; and
      transmitting, by the MME and to the particular SCEF instance, a subsequent message for the session, wherein a second SCEF-ID of the subsequent message is associated with the identifier and is different from the first SCEF-ID.

9. The system of claim 8, the operations further comprising:
   receiving, by the MME, a user equipment (UE) request associated with a UE for a connection via the SCEF, wherein the transmitting the connection request to establish the session is performed based at least in part on the UE request.

10. The system of claim 9, the operations further comprising:
    receiving, by the MME, another UE request for another connection via the SCEF;
    transmitting another connection request to the SCEF using the first SCEF-ID; and
    receiving, by the MME and from another particular SCEF instance of the SCEF, another answer to the other connection request, the other answer including another identifier that is different from the first SCEF-ID, the other identifier associated with the other particular SCEF instance.

11. The system of claim 9, wherein the MME is configured to use the first SCEF-ID for a plurality of connection requests associated with different UE.

12. The system of claim 9, wherein the UE is a Narrowband Internet of Things (NB-IoT) device.

13. The system of claim 8, the operations further comprising:
    receiving, by the MME, the first SCEF-ID from a Home Subscriber Server (HSS).

14. The system of claim 8, wherein the identifier is an origin-host identifier included in the answer.

15. A non-transitory computer-readable media storing computer-executable instructions, which when executed by one or more processors, cause the one or more processors to perform operations comprising:
    receiving, by a Mobility Management Entity (MME), a user equipment (UE) request associated with a UE for a connection via a service capability exposure function (SCEF);
    transmitting, by the MME and to the SCEF, a connection request to establish a session, the request using a first SCEF identifier (ID);
    receiving, by the MME and from a particular SCEF instance of the SCEF, an answer for the session, the answer including an identifier that is different from the first SCEF-ID, the identifier associated with the particular SCEF instance; and
    transmitting, by the MME and to the particular SCEF instance, a subsequent message for the session, wherein a second SCEF-ID of the subsequent message is associated with the identifier and is different from the first SCEF-ID.

16. The non-transitory computer-readable media of claim 15, the operations further comprising:
    receiving, by the MME, another UE request for another connection via the SCEF;

transmitting another connection request to the SCEF using the first SCEF-ID; and receiving, by the MME and from another particular SCEF instance of the SCEF, another answer to the other connection request, the other answer including another identifier that is different from the first SCEF-ID, the other identifier associated with the other particular SCEF instance.

17. The non-transitory computer-readable media of claim 16, wherein the MME is configured to route a plurality of subsequent requests associated with the session to the SCEF instance based on the second SCEF-ID.

18. The non-transitory computer-readable media of claim 15, the operations further comprising:

receiving, by the MME, the first SCEF-ID from a Home Subscriber Server (HSS).

19. The non-transitory computer-readable media of claim 15, wherein the MME is configured to use the first SCEF-ID for a plurality of connection requests associated with different UE.

20. The non-transitory computer-readable media of claim 15, wherein the identifier is an origin-host identifier included in the answer.

* * * * *